United States Patent
Dobson, Jr. et al.

(10) Patent No.: US 9,850,417 B2
(45) Date of Patent: Dec. 26, 2017

(54) ULTRA HIGH VISCOSITY PILL AND METHODS FOR USE WITH AN OIL-BASED DRILLING SYSTEM

(71) Applicant: TUCC Technology, LLC, Houston, TX (US)

(72) Inventors: James W. Dobson, Jr., Houston, TX (US); Kim O. Tresco, Houston, TX (US); Benjamin K. Geerdes, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 222 days.

(21) Appl. No.: 13/739,979

(22) Filed: Jan. 11, 2013

(65) Prior Publication Data

US 2013/0130944 A1 May 23, 2013

Related U.S. Application Data

(62) Division of application No. 12/833,673, filed on Jul. 9, 2010, now abandoned.

(Continued)

(51) Int. Cl.
*C09K 8/02* (2006.01)
*C09K 8/74* (2006.01)
(Continued)

(52) U.S. Cl.
CPC .............. *C09K 8/34* (2013.01); *C09K 8/14* (2013.01); *C09K 8/32* (2013.01)

(58) Field of Classification Search
CPC ............... C09K 8/14; C09K 8/32; C09K 8/34
(Continued)

(56) References Cited

U.S. PATENT DOCUMENTS 5,883,054 A * 3/1999 Hernandez et al. .......... 507/117
6,180,573 B1 1/2001 Nattier et al.
(Continued)

FOREIGN PATENT DOCUMENTS

EP 0254412 1/1988
WO 97/04038 2/1997
(Continued)

OTHER PUBLICATIONS

MSDS data sheet of propylene carbonate from Sigma-Aldrich, 2012.
(Continued)

*Primary Examiner* — Aiqun Li
(74) *Attorney, Agent, or Firm* — Lewis, Reese & Nesmith, PLLC

(57) ABSTRACT

A fluid pressure transmission pill (FPTP) having an ultra-high viscosity for use in association with hydrocarbon drilling and exploration operations, particularly, managed pressure drilling (MPD) operations, is described. The ultra-high viscosity pill is a weighted pill composition that includes a hydrocarbon fluid, a thixotropic viscosifying agent, one or more activators, an emulsifier/wetting agent, a fluid loss control additive, and a weighting material. In accordance with selected aspects of the described fluid pressure transmission pill, the ratio of the amount of the thixotropic viscosifying agent to the activator is a ratio of about 7:1, and the weighting material is a barium-containing solid-phase material. Also described are methods of use of such FPTP products in subterranean operations, such as well killing operations during managed pressure drilling.

10 Claims, 12 Drawing Sheets

Related U.S. Application Data

(60) Provisional application No. 61/224,136, filed on Jul. 9, 2009.

(51) Int. Cl.
    *E21B 43/16* (2006.01)
    *C09K 8/34* (2006.01)
    *C09K 8/14* (2006.01)
    *C09K 8/32* (2006.01)

(58) Field of Classification Search
    USPC .................. 507/103, 269, 906; 166/305.1
    See application file for complete search history.

(56) References Cited

U.S. PATENT DOCUMENTS

| | | |
|---|---|---|
| 2006/0148654 A1 | 7/2006 | Dobson, Jr. |
| 2006/0166839 A1 | 7/2006 | Miller |
| 2008/0171670 A1 | 7/2008 | Cowan et al. |
| 2010/0186957 A1* | 7/2010 | Prebensen et al. ........... 166/300 |

FOREIGN PATENT DOCUMENTS

| | | |
|---|---|---|
| WO | 2005/118742 A2 | 12/2005 |
| WO | 2006079778 | 8/2006 |

OTHER PUBLICATIONS

BAROID product data sheet of Halliburton, 2010.
Emmanuel Zimpfer, International Search Report for International Patent Application No. PCT/US2010/041542, European Patent Office, dated Sep. 22, 2010.
Emmanuel Zimpfer, Written Opinion International Patent Application No. PCT/US2010/041542, European Patent Office, dated Sep. 22, 2010.
XP-07 product datasheet of Halliburton, Mar. 2010.

* cited by examiner

ULTRA HIGH VISCOSITY PILL AND METHODS FOR USE WITH AN OIL-BASED DRILLING SYSTEM

CROSS REFERENCE TO RELATED APPLICATIONS

The present application is a divisional patent application of U.S. patent application Ser. No. 12/833,673, filed Jul. 9, 2010, which claims priority to U.S. Provisional Patent Application Ser. No. 61/224,136, filed Jul. 9, 2009, the contents of all of which are incorporated herein by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to hydrocarbon drilling and exploration operations, and more specifically are related to fluid pressure transmission pills and their manufacture and use in support of drilling and exploration operations.

Description of the Related Art

Various types of well bore fluids are used in operations related to the development, completion, and production of natural hydrocarbon reservoirs. Typical operations include fracturing subterranean formations, modifying the permeability of subterranean formations, logging operations, and sand control, among others. Of particular interest with regard to the present inventions are fluids appropriate for use in performing managed pressure drilling (MPD) operations, particularly those in high-temperature, high-pressure hydrocarbon fields, where standard drilling fluids have an insufficient density for tripping drill pipe, wireline logging, or other operations.

Managed pressure drilling (MPD) is a relatively recent adaptive drilling process, similar in some aspects to underbalanced drilling, used to precisely control the annular pressure profile throughout the well during the course of a drilling operation, thereby reducing drilling problems. The primary objective of the MPD concept is to maintain a balanced well bore pressure within the critical tolerances defined by the pore pressure, well bore stability, and fracture pressure. For example, MPD could be used to manage and maintain the pressure between the pore pressure and the fracture pressure of a reservoir, while simultaneously compensating for the influx of fluids that may occur during drilling without encouraging such an influx. MPD uses a number of tools to mitigate the risks and costs associated with drilling wells by managing the annular pressure profile. Typical techniques applied to date have included controlled backpressure, fluid density, fluid rheology, annular fluid level, circulating friction, and hole geometry [see, Hannigan, D., SPE paper 92600, 2005].

As illustrated in numerous studies, problems in deep wells can be caused by well bore pressure deviating outside the pressure gradient window during drilling operations, resulting in non-productive time. For example, at shallow depths, if the well bore pressure deviates below the pore pressure gradient, water or gas can flow into the well bore, and a kick can occur, or in some instances the well bore may become unstable and collapse on the drill pipe. A major problem when pressure exceeds the fracture pressure-gradient is lost circulation, with a loss of mud into the formation with subsequent reservoir damage. These pressure deviation issues account for numerous drilling problems, which in turn have a significant impact on drilling costs and well performance. Consequently, new methods and systems for managing well bore pressure in drilling operations, based on managed pressure drilling (MPD) technologies, is needed to alleviate these drilling issues.

The inventions disclosed and taught herein are directed to viscous isolation pills, also referred to herein as fluid pressure transmission pills (FPTP) used during managed pressure drilling (MPD) operations. FPTP serve as a barrier to prevent intermixing of the lower density drilling fluid being utilized in the drilling operation and a heavier density fluid which is applied to achieve a total hydrostatic pressure overbalance in the fluid column that is sufficient for well control when tripping drill pipe, conducting wireline logging, or performing other subterranean operations.

BRIEF SUMMARY OF THE INVENTION

Applicants have invented ultra-high viscosity well treatment pill compositions, also referred to herein equivalently as fluid pressure transmission pills (FPTPs), suitable for use in managed pressure drilling (MPD) operations, wherein the composition has an overall viscosity greater than 100,000 centipoise (cP) (measured at 0.0660 sec$^{-1}$), a mud weight of at least 7.0 lb/gal, and which exhibits pill stability for more than 24 hours.

In accordance with a first embodiment of the present disclosure, a fluid pressure transmission pill (FPTP) for use in a managed pressure drilling (MPD) operation is described, wherein the pill comprises an oleaginous (hydrocarbon oil) phase, a thixotropic viscosifying agent, an activator, an emulsifier/wetting agent, a fluid loss control additive, and a weighting material. In accordance with aspects of this embodiment, the thixotropic viscosifying agent is an organophilic clay, present in an amount ranging from about 6 lb/bbl to about 16 lb/bbl, and more preferably from about 10 lb/bbl to about 14 lb/bbl. In accordance with further aspects of this embodiment, the weighting material is a solid-phase material selected from the group consisting of barite, calcite, hematite, ilmenite, or combinations thereof.

In accordance with a further embodiment of the present disclosure, an ultra-high viscosity treatment pill for use in managed pressure drilling (MPD) operations is described, wherein the pill composition comprises a low aromatic content mineral oil, an organophilic clay, a polar activator, an emulsifier/wetting agent, a fluid loss control additive, and a weighting material. In accordance with aspects of this embodiment, the organophilic clay is included in the composition in an amount ranging from about 6 lb/bbl to about 16 lb/bbl, and the activator is included in an amount which is about 0.1 on a weight-to-weight basis of the amount of the organophilic clay in the composition. In accordance with further aspects of this embodiment, the weighting material is a solid-phase material selected from the group consisting of barite, calcite, hematite, ilmenite, or combinations thereof. In one additional aspect of this embodiment, the weighting material is preferably barite.

In accordance with yet another embodiment of the present disclosure, a method of drilling a subterranean well utilizing a fluid pressure transmission pill (FPTP) in conjunction with an oil-based drilling fluid in a managed pressure drilling (MPD) operation is described, wherein the drilling fluid comprises an oleaginous liquid, a thixotropic viscosifying agent, emulsifiers, wetting agents, fluid loss control additives, and weighting material, all of which are described within this disclosure. In accordance with aspects of this embodiment, the drilling fluid may include a brine solution to form an invert (water-in-oil) emulsion wherein the aqueous phase is dispersed within the oleaginous phase, and stabilized by one or more emulsifiers which are effective in invert emulsions.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1A:
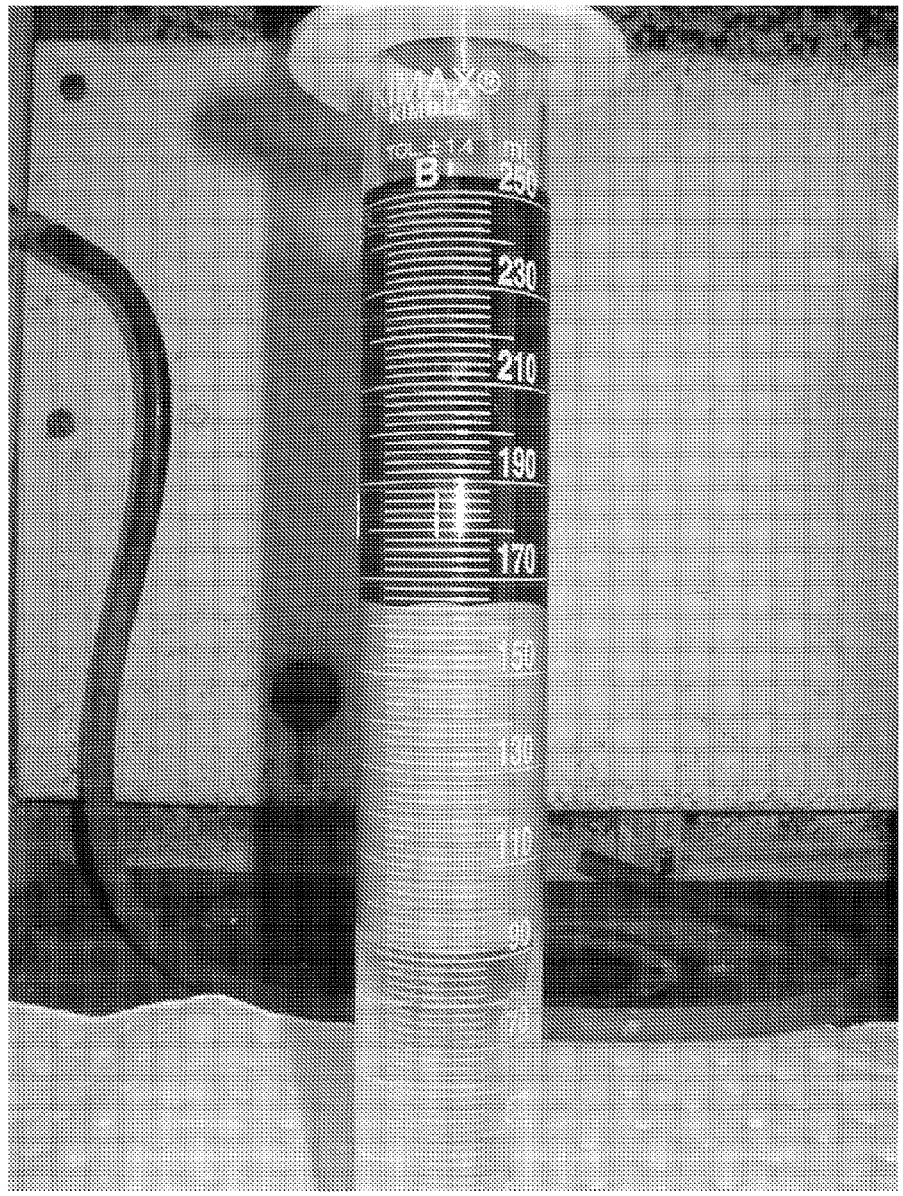
FIG. 1A illustrates a 12.5 lb/gal fluid pressure transmission pill (FPTP) composition of the present disclosure above 12.5 lb/gal $CaBr_2$ brine and below 17.0 lb/gal $Zn/Br_2$ brine at hour 0 at a vertical orientation.
Figure 1B:
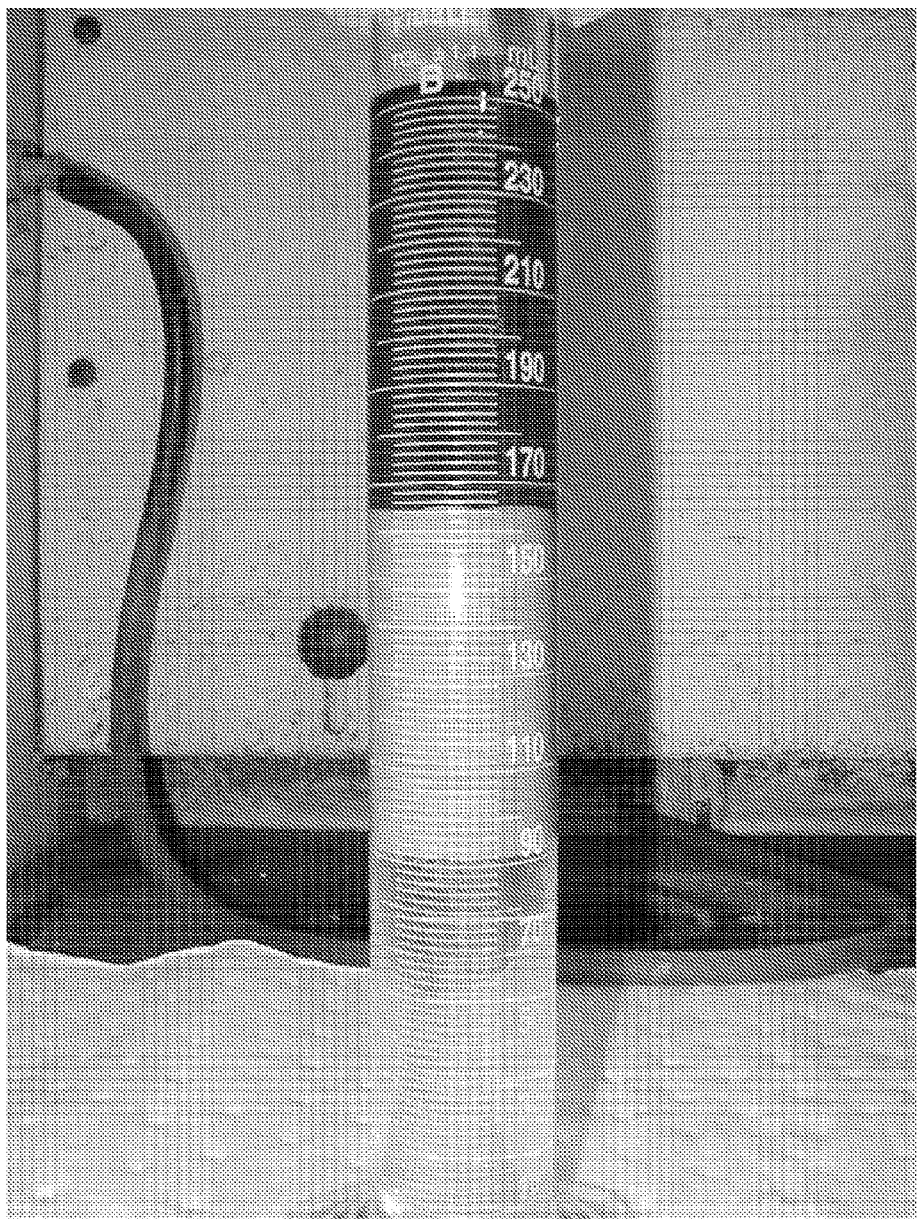
FIG. 1B illustrates the FPTP (12.5 lb/gal) composition of FIG. 1A at 24 hours at a vertical orientation.
Figure 1C:
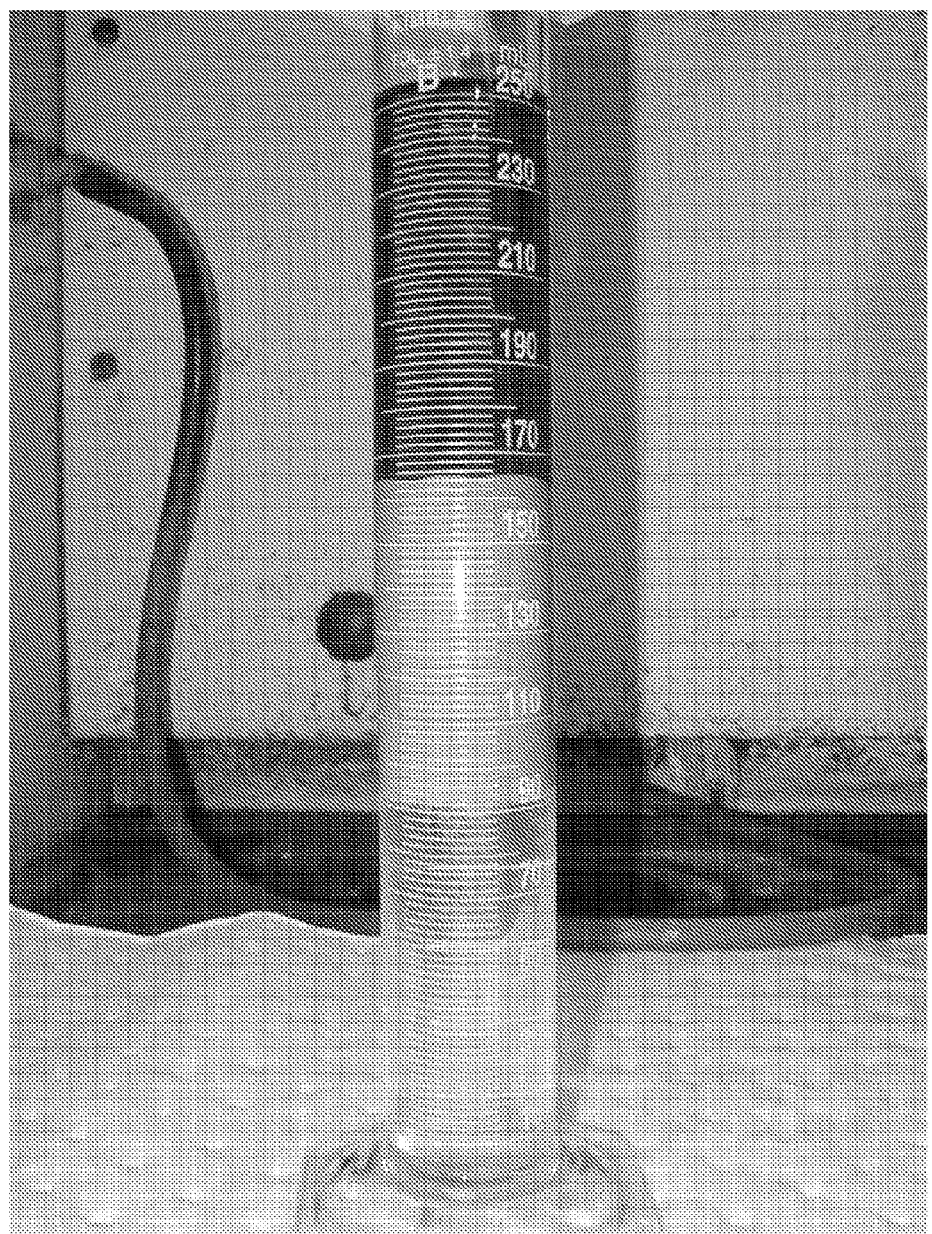
FIG. 1C illustrates the FPTP (12.5 lb/gal) composition of FIG. 1A at 48 hours at a vertical orientation.
Figure 1D:
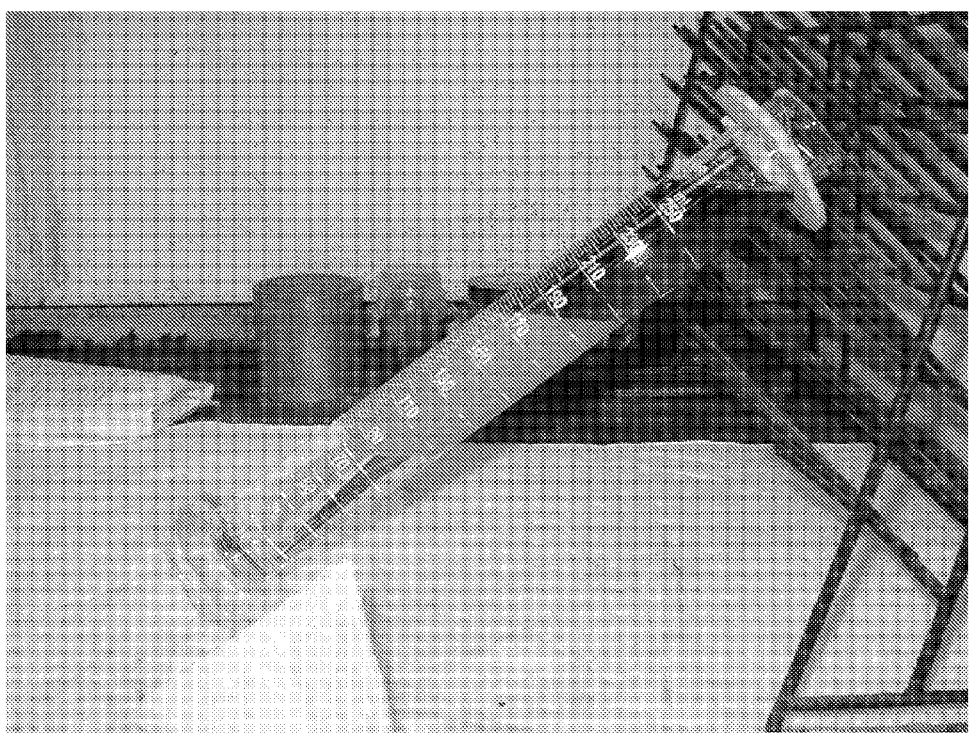
FIG. 1D illustrates a FPTP (12.5 lb/gal) composition of the present disclosure above 12.5 lb/gal $CaBr_2$ brine and below 17.0 lb/gal $Zn/Br_2$ brine at hour 0 at a 45° angle of deviation.
Figure 1E:
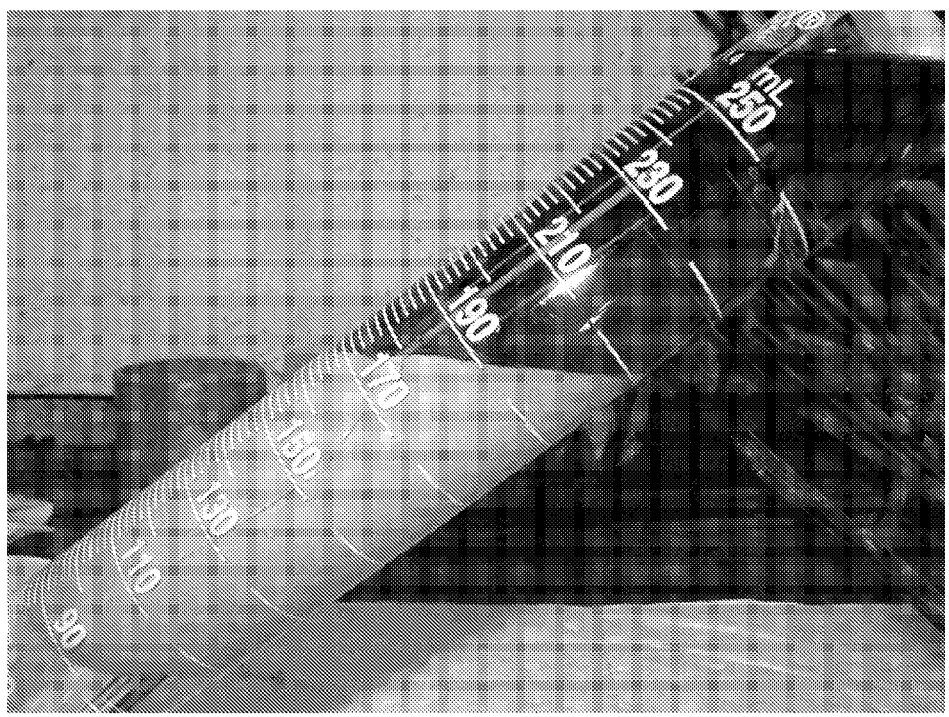
FIG. 1E illustrates the FPTP (12.5 lb/gal) composition of FIG. 1D at 24 hours at a 45° angle of deviation.
Figure 1F:
FIG. 1F illustrates the FPTP (12.5 lb/gal) composition of FIG. 1D at 48 hours at a 45° angle of deviation.
Figure 1G:
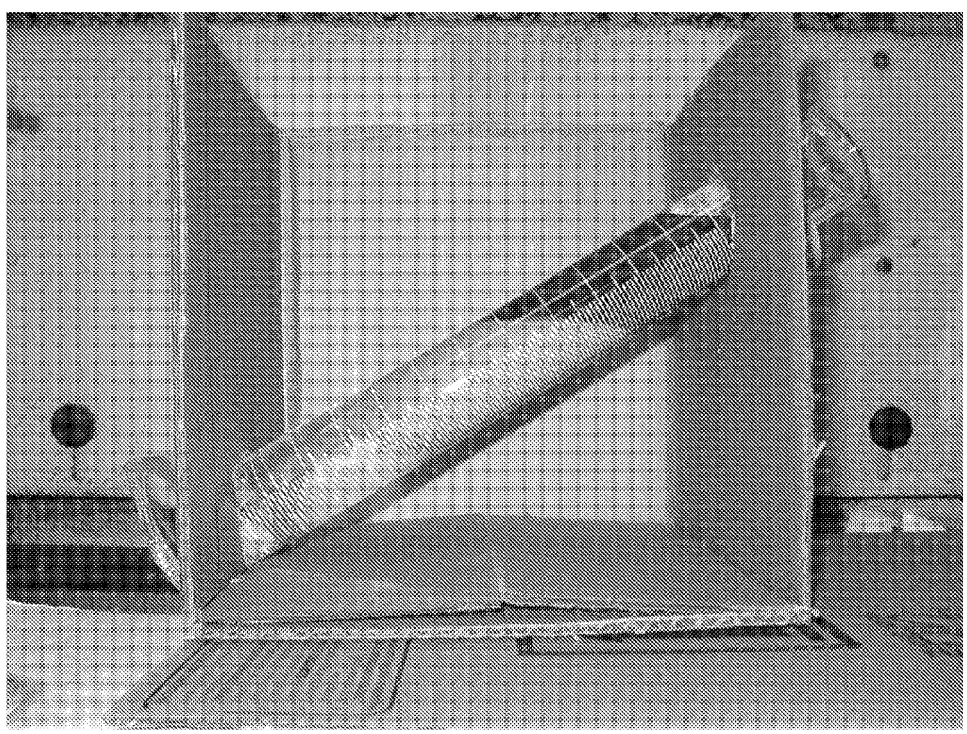
FIG. 1G illustrates a FPTP (12.5 lb/gal) composition of the present disclosure above 12.5 lb/gal $CaBr_2$ brine and below 17.0 lb/gal $Zn/Br_2$ brine at hour 0 at a 60° angle of deviation.
Figure 1H:
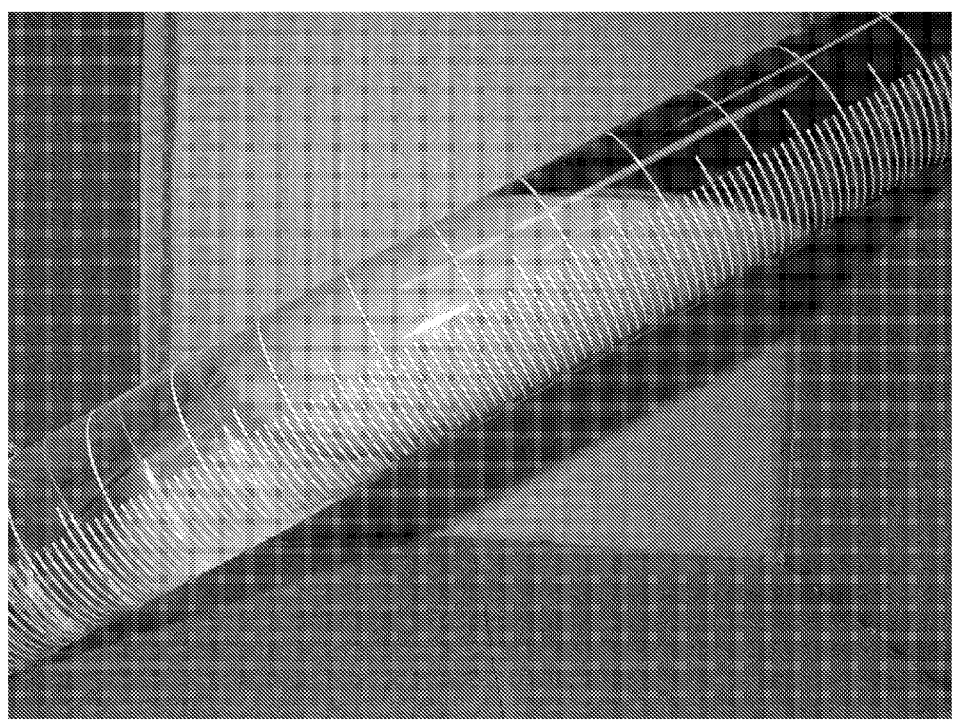
FIG. 1H illustrates the FPTP (12.5 lb/gal) composition of FIG. 1G at 24 hours at a 60° angle of deviation.
Figure 1I:
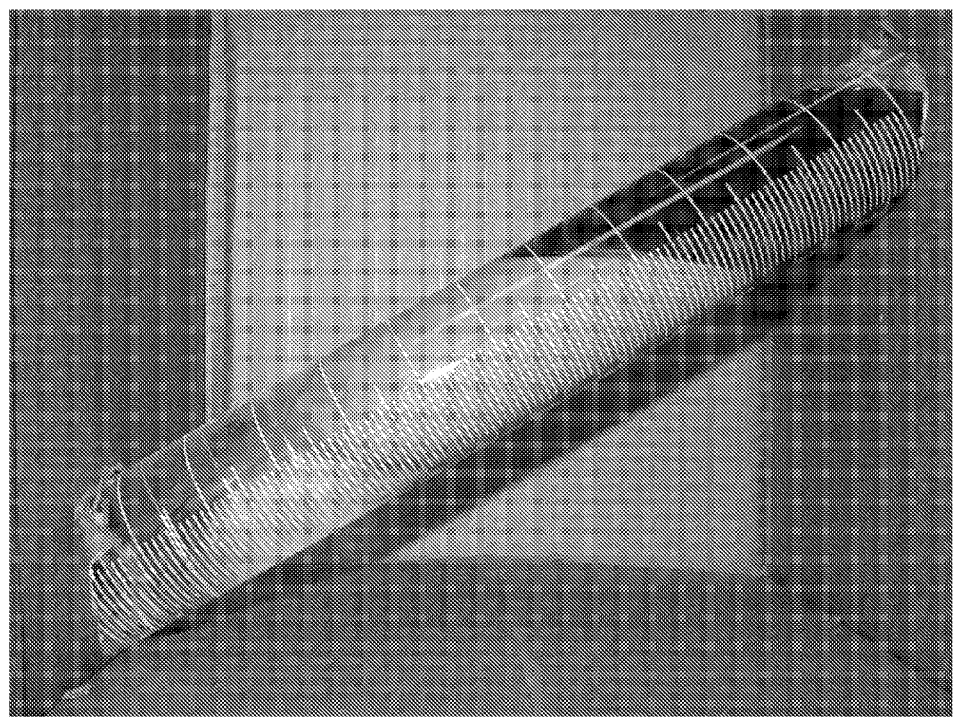
FIG. 1I illustrates the FPTP (12.5 lb/gal) composition of FIG. 1G at 48 hours at a 60° angle of deviation.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created new compositions for use in performing managed pressure drilling (MPD) of subterranean formations. In particular, a fluid pressure transmission pill (FPTP), or 'balanced mud pill', has been developed, which is useful in balancing subterranean reservoir and well bore pressures during a number of hydrocarbon exploration and recovery operations.

In accordance with aspects of the present disclosure, a fluid pressure transmission pill (FPTP) for use in controlling and/or balancing subterranean pressures during a drilling operation within a well bore has been developed, wherein the pill has an ultra-high viscosity (the term 'ultra-high viscosity' as used herein meaning a viscosity greater than about 100,000 cP, measured at 0.0660 $sec^{-1}$), and comprises at least a fluid phase, a thixotropic viscosifying agent, an activator, and a weighting material. The composition may optionally comprise one or more emulsifiers and/or wetting agents, and fluid loss control additives, as appropriate, and in association with the viscosifying agent.

The fluid phase which is suitable for use in the fluid pressure transmission pill (FPTP) compositions of the present disclosure include but are not limited to hydrocarbons and oleaginous liquids. As used herein the term "oleaginous liquid" means a hydrocarbon or an oil which is a liquid at 25° C. and is substantially immiscible with water. Oleaginous liquids suitable for use herein typically include substances such as diesel oil, mineral oil (including low aromatic content mineral oils), synthetic oil such as polyolefins or isomerized polyolefins, ester oils, glycerides of fatty acids, aliphatic esters, aliphatic ethers, aliphatic acetals, or other such hydrocarbons and combinations of these fluids. In one illustrative embodiment of this invention, the fluid phase includes an oleaginous liquid that is a low aromatic mineral oil. As used herein, the term 'low aromatic mineral oil' means that the oil contains less than about 1% aromatics.

The thixotropic viscosifying agents suitable for use herein include, but are not limited to, clays, and in particular include organophilic clays. The organophilic clay is a well-known, commercially available thixotropic viscosifying agent for organic liquids. Suitable organophilic clays also include the reaction products of smectite-type, hectorite clays, or other clays and organic cations, i.e., quaternary ammonium cations (sometimes referred to as organophillic clay gellants); smectite clays; kaolin clays; and the like. The preferred organophilic clays used as a thixotropic viscosifying agent, in accordance with one aspect of the present invention, is a smectite-type clay that is selected from the group consisting of bentonite, hectorite, montmorillonite, nontronite, biedellite, saponite, stevensite, and mixtures thereof, most preferably bentonite or hectorite. The preferred quaternary ammonium cations, in the event that the clay used is the reaction product of a clay and a quaternary ammonium compound, are selected from the group consisting of methyl trihydrogenated tallow ammonium, dimethyl dehydrogenated tallow ammonium, dimethyl benzyl hydrogenatedtallow ammonium, methyl benzyl dehydrogenated tallow ammonium, and mixtures thereof. Exemplary organoclays and clay gellants suitable or use with the compositions described herein are set forth in the following U.S. patents, all incorporated herein by reference in relevant part: U.S. Pat. No. 2,531,427; U.S. Pat. No. 2,966,506; U.S. Pat. No. 4,105,578; and U.S. Pat. No. 4,208,218. Exemplary, commercially available organophilic clays suitable for use with the compositions described herein are CLAYTONE® IMG 400, available from Southern Clay Products, Inc., Gonzalez, Tex., U.S.A., or BENTONE® 38 Organoclay (a commercial hectorite-based product, available form a number of suppliers).

The activator suitable for use in accordance with the compositions and methods of the present disclosure includes any suitable activator for use with clay-type thixotropic viscosifying agents. Suitable activators for use with the presently described compositions include, but are not limited to, sodium silicate, sodium fluoride, sodium silicofluoride, magnesium silicofluoride, zinc silicofluoride, calcium carbonate, sodium carbonate, potassium carbonate, alkyl carbonates, calcium hydroxide, sodium hydroxide, potassium hydroxide, sodium sulfate, polar, aprotic compounds, and mixtures thereof. In accordance with one aspect of the present disclosure, the polar activator is a cyclic carbonate, propylene carbonate. In further accordance with aspects of the present disclosure, the amount of polar activator included in the fluid pressure transmission pill compositions is generally less than the amount of thixotropic viscosifying agent added to the composition, on a weight-to-weight basis. In accordance with further aspects of the present disclosure, the amount of polar activator included in the composition with regard to the amount of thixotropic viscosifying agent is in a ratio ranging from about 1:5 to about 1:10, as well as ratios within this range, and more preferably in a ratio of about 1:7 of activator to viscosifying agent.

The ultra-high viscosity fluid pressure transmission pill (FPTP) may also include an emulsifier, a wetting agent, or both (that is, a compound that may be classified as either an emulsifier or a wetting agent). Emulsifiers and wetting agents suitable for use with the compositions of the present disclosure include nitrogen containing compounds, such as quaternary amines having one or more straight or branched alkyl chains containing from 6 to 20 carbon atoms. These include, but are not limited to, various fatty acid soaps, including oxidized tall oil soaps, preferably the calcium soaps whether pre-formed or prepared in-situ in the fluid; polyamides; alkylamidoamines; imidazolines; alkyl sulfonates; fatty acyl esters; lecithin; and the like. These may also include the so-called primary emulsifiers and secondary emulsifiers. Exemplary emulsifiers suitable for use with the compositions and methods of the present disclosure include, but are not limited to, those described in U.S. Pat. Nos. 2,876,197; 2,994,660; 2,962,881; 2,816,073; 2,793,996; 2,588,808; 3,244,638; 4,504,276; 4,509,950; 4,776,966; and 4,374,737, all of which are incorporated herein by reference in relevant part.

The preferred oil-soluble polymeric fluid loss control additive for use in the invention comprise styrene-butadiene copolymers known in the art as SBR (styrene-butadiene rubber). The styrene content of the SBR is preferably from about 15% by weight to about 45% by weight of the SBR, more preferably from about 20% to 35% by weight, and most preferably from about 20% to about 25% by weight of the SBR. It is known to prepare SBR by emulsion polymerization using either a "hot process" or a "cold process". The hot process is conducted at a temperature of about 50° C. whereas the polymerization in a cold process is about 15° C. to about 20° C. The cold process results in a SBR which contains less branching than in the hot process, i.e., the SBR molecules from the cold process contain more linear molecules than the SBR from the hot process. It is preferred that the SBR be prepared using a cold process. It is also preferred that the SBR not be crosslinked. Other oil-soluble polymers for use in this invention include, but are not limited to, polystyrene, polybutadiene, polyethylene, polypropylene, and copolymers consisting of at least two monomers selected from the group consisting of styrene, butadiene, isoprene, ethene and derivatives thereof, and propylene.

In accordance with one aspect of the present invention, the weighting material suitable for use in accordance with the present disclosure is preferably a solid-phase material selected from the group consisting of anglesite ($PbSO_4$), barite ($BaSO_4$) and other barium-containing minerals or materials, calcite ($CaCO_3$), celestite/celestine ($SrSO_4$), crocoite ($PbCrO_4$), hematite ($Fe_2O_3$), ilmenite ($FeTiO_3$), or combinations thereof. Preferably, in accordance with certain aspects of the present disclosure, the weighting agent is barite, a solid-phase barium-containing compound or mineral, or a sulfate of the Strunz Class 07.A or 07.AD (as described in the Nickel-Strunz $10^{th}$ Ed. Mineralogical Tables, by Hugo Strunz and Ernest H. Nickel). Such a preferred weighting agent includes preferentially the naturally occurring mineral composed primarily of barium sulfate, $BaSO_4$ (although other minerals may be included therein, such as lead, zinc in the form of zinc sulfide, and the like), although drilling grade barite such as produced from barium sulfate-containing ores from a single source or by blending material from several sources may also be used. Exemplary barium-containing minerals which may be used as a weighting material in accordance with the compositions of the present disclosure include but are not limited to alstonite ($CaBa(CO_3)_2$), barite ($BaSO_4$), barytocalcite ($BaCa(CO_3)_2$), celsian ($BaAl_2Si_2O_8$), kukharenkoite ($Ba_3CeF(CO_3)_3$), psilomelane ($Ba(Mn^{2+})(Mn^{4+})_8O_{16}(OH)_4$), sanbornite ($BaSi_2O_5$) and witherite ($BaCO_3$), as well as combinations thereof. The American Petroleum Institute (API) has issued international standards to which ground barite must comply in association with drilling operations, specifically API Specification 13A, Section 2, which are incorporated herein by reference, and which standards include a minimum density of about 4.1-4.2 g/cm$^3$, a weight average particle size diameter between about 5 μm and about 75 μm, an amount of water-soluble alkaline earth metals (as calcium) of less than about 40 ppm, and an amount of barite particles having a size less than about 6 mm by weight in an amount of no more than 25 wt. %.

According to one illustrative embodiment, the weight average particle diameter of the weighting agent suitable for use in the compositions disclosed herein ranges from about 5 μm to about 50 μm. In another illustrative embodiment, the weighting agent includes at least 50% by weight particles in the range of about 10 μm to about 50 μm. In a further illustrative embodiment, the weighting agent includes at least 70% by weight of particles in the range of about 5 μm to about 50 μm. The use of these particle sizes, in association with the weighting agents used in the instant compositions, enables one to achieve the objective of maintaining a separation between a high density drilling fluid above and a lower density drilling fluid below, without undesirably increasing the well bore fluid viscosity or allowing a loss of integrity in the pill itself.

The fluid pressure transmission pills (FPTP) described herein may also include a number of other additives, including but not limited to corrosion inhibitors, scale inhibitors, and fluid loss control additives. Any of the typically used fluid loss control additives known in the industry can be present in the fluid pressure transmission pill, such as gilsonite, asphalt, oxidized asphalt, organophilic lignites, and the like. Exemplary organophilic lignites suitable for use in compositions of the present disclosure are set forth in the following U.S. Pat. No. 3,168,475 (Jordan et al.); U.S. Pat. No. 3,379,650 (Beasley, et al.); U.S. Pat. No. 3,494,865 (Andrews, et al.); U.S. Pat. No. 4,421,655 (Cowan); U.S. Pat. No. 4,597,878 (House, et al.); and U.S. Pat. No. 4,853,465 (Cowan, et al.), all of which are incorporated herein by reference in pertinent part.

The fluid pressure transmission pills (FPTP) described herein can be used in a number of applications related to hydrocarbon exploration, including, but not limited to, managed pressure drilling (MPD), both horizontal and vertical drilling operations, tripping operations, wireline logging operations, completion operations, well control operations, well logging operations, and the like. In particular, the compositions described herein are particularly suited for use in high-pressure, high-temperature subterranean environments. In a non-limiting example, the FPTP described herein exhibits thermal stability across a broad range of temperatures, and may be used with a drilling fluid for drilling wells in subterranean formations having a variety of geologies, wherein the subterranean formation has temperatures ranging from about 15° F. to about 450° F.

As will be recognized by those skilled in the art, other additives suitable for use in subterranean well bore drilling operations also may be present in the drilling fluids of the present invention if desired, including but not limited to, antifoams, biocides, bridging agents, corrosion control agents, dispersants, flocculants, fluid loss additives, foamers, $H_2S$ scavengers, lubricants, oxygen scavengers, scale inhibitors, viscosifiers, and weighting agents. One of ordinary skill in the art with the benefit of this disclosure will be able to determine if any of these such additives are needed for a given application. Further, when the fluid pressure transmission pill (FPTP) compositions of the present disclosure are used in drilling operations, such as in managed pressure drilling (MPD) operations and the like, the fluid may further comprise one or more brines. Suitable brines for use with the FPTP compositions of the present disclosure include, but are not limited to, both light and heavy brines comprising KCl brines, NaCl brines, $CaCl_2$ brines, $NaCO_2H$ brines, $KCO_2H$ brines, $CsCO_2H$ brines, NaBr brines, $CaBr_2$ brines, KBr brines, $CaCl_2/CaBr_2$ brines, $ZnBr_2$ brines, $ZnCl_2$ brines, $ZnBr_2/CaBr_2$ brines, and $ZnBr_2/CaBr_2/CaCl_2$ brines, alone or in combination as appropriate. The brines, both light and heavy, can be described in accordance with certain aspects of the present disclosure as an aqueous solution which contains from about 10 to about 350,000 parts per million of metal ions, such as lithium, sodium, potassium, magnesium, cesium, zinc, or calcium ions. In accordance with aspects of the invention, the brines used in the compositions described herein may be described as containing from about 2% by weight to the saturated amount (e.g., about 35% by weight for $CaCl_2$) of the salt, which will vary by salt used in forming the brine. The brines used to in the compositions of the present invention may also contain various amounts of other dissolved salts, including but not limited to sodium bicarbonate, sodium sulfate, sodium acetate, sodium borate, potassium chloride, or sodium chloride, without limitation.

The fluid compositions of the present invention include at least one oleaginous liquid, and may include a brine so as to form an emulsion, an invert fluid, or oil-as based invert emulsions. The term oil based drilling fluids as used herein are defined as a hydrocarbon-based drilling fluids. Oil based invert emulsions have an oil "continuous" phase and an aqueous internal phase. The term "emulsion" as used herein is used to describe systems in which water is the external or continuous phase and oil is dispersed within the external phase. By the term "invert", it is meant that the hydrocarbon—oil substance is the continuous or external phase and that an aqueous fluid, such as water or a brine, is the internal phase.

The ratio of water (or brine) to oil in emulsions of the present invention should generally provide as high a brine content as possible while still maintaining a stable emulsion since a high water content drilling fluid is less expensive and less objectionable to work with than a drilling fluid containing a low water content. Oil/brine ratios in the range from about 95 to 5 (95:5) to 50 to 50 (50:50) have been found to work satisfactorily, depending upon the particular oil/oleaginous fluid chosen. Thus the water (or brine) content of a typical fluid prepared according to the teachings of the invention may have, in accordance with certain embodiments, an aqueous (water or brine) content ranging from about 0 volume percent (vol. %) to about 50 volume percent, with the most preferred range being about 5 to 40 volume percent.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Further, in the examples herein, in expressing or converting between U.S. and S.I. or metric measurements, the following U.S. to metric conversion factors are used: 1 gal=3.785 liters; 1 lb=0.454 kg; 1 lb/gal=0.1198 g/cm$^3$; wherein 1 bbl=42 gal; 1 lb/bbl=2.835 kg/m$^3$; 1 lb/100 ft$^2$=0.4788 Pa.

EXAMPLES

Example 1: Preparation of Ultra-High Viscosity Fluid Pressure Transmission Pills (FPTP)

An organophilic clay (CLAYTONE® IMG 400, available from Southern Clay Products, Inc., Gonzalez, Tex.) was added to 0.675 bbl of a low aromatic mineral oil (PUREDRILL® HT-30, available from Petro-Canada, Calgary, Canada) and allowed to disperse equally before adding 0.18 gal/bbl of propylene carbonate (JEFFSOL®, available from Huntsman Petrochemical Corp., Houston, Tex.). The ingredients were then mixed for 10 minutes at 5000 rpm with an impeller-style mixer forming a 'clay gel'. To this clay gel composition was added 0.144 gal/bbl of an emulsifier/wetting agent (STAB 2-CA, available from Quim Export, Inc., Houston, Tex.) and the solution was mixed for 5 minutes at 3000 rpm. Additionally, 4.32 gal/bbl of an oil-soluble copolymer slurry containing 17.5 lb/bbl of styrene-butadiene rubber (SBR 8113 Crumb, available from ISP Elastomers, Port Neches, Tex.), solubilized in 39.9 gal/bbl of low aromatic mineral oil (PUREDRILL® HT-30, available from Petro-Canada, Calgary, Canada), was then added and the solution mixed for an additional 2 minutes at 3000 rpm. Barium sulfate (Barite, available from Federal Wholesale Drilling Mud, Houston, Tex.) at a concentration of 288 lb/bbl was then added, and the final fluid composition was mixed for an additional 30 minutes at 5000 rpm before analyzing and testing as described below.

A viscosity measurement for the ultra-high viscosity pill thus prepared was performed by determining the Low Shear Rate Viscosity (LSRV) with a Brookfield LVDII+ viscometer at 0.3 rpm using a No. 3 cylindrical spindle. The result is shown in Table 1, below.

In order to assess the ability and integrity of the ultra-high viscosity pill to isolate a high-density oil-base drilling fluid in the upper region of a well bore from a lighter oil-base fluid in the deeper section, a series of observational laboratory tests were conducted using both vertically-oriented and angled 250 mL graduated cylinders to simulate a well bore. The focus of these tests was to determine the long-term stability of the fluid pressure transmission pills (FPTP) over an extended period of time. In a typical test for demonstration purposes, brines were substituted for oil-base drilling fluids above and below the FPTP to provide a more visible interface between stages. First, 85 mL of a 12.5 lb/gal CaBr$_2$ brine was added to a 250 mL glass graduated cylinder, and then 85 mL of a 12.5 lb/gal high-viscosity pill prepared as described above was added on top of the brine by slowly releasing it from a syringe down the side of the cylinder. Finally, a 17.0 lb/gal ZnBr$_2$ brine was added on top of the pill. The total volume placed in the cylinder was about 255 mL. Vertical, 45°, and 60° angles of deviation were established, and visual observations were made, and the observations were documented with photographs taken at time zero (0), 24-hours, and 48 hours. These results are illustrated in FIGS. 1A-1I, herein. As can be seen from these figures, the pill remains intact over the entire time period tested, with no brine channeling through the FPTP, even at cylinder test inclination angles of 45° and 60°.

Example 2. Preparation of Fluid Pressure Transmission Pills (FPTP) with Varied Amounts of Thixotropic Viscosifier Two FPTP having reduced organophilic clay concentrations, were prepared in order to demonstrate how lesser viscosity pills fail to create the barrier required to retain heavier fluids. An amount of organophilic clay (CLAYTONE® IMG 400 available from Southern Clay Products, Inc., Gonzales, Tex.), ranging from about 6 lb/bbl to 8 lb/bbl was added to 0.772 bbl of a low aromatic mineral oil (PUREDRILL® HT-30, available from Petro-Canada, Calgary, Canada) and allowed to disperse equally before adding 0.12 gal/bbl of propylene carbonate (JEFFSOL®, available from Huntsman Petrochemical Corp., Houston, Tex.). The ingredients were then mixed for 15 minutes at 4600 RPM with an impeller-style mixer, forming a 'clay gel'. To this clay gel composition was added 0.30 gal/bbl of emulsifier/wetting agent (STAB 2-CA, available from Quim Export, Inc., Houston, Tex.), and the solution mixed for 5 minutes before adding 298 lb/bbl of barium sulfate (Barite, available from Federal Wholesale Drilling Mud, Houston, Tex.). The complete pill composition was then mixed for an additional 15 minutes at 3000 rpm before analyzing and testing as described below.

Viscosity measurements were carried out as described above, and were obtained at 0.0636 sec$^{-1}$ and 0.0660 sec$^{-1}$. The results of these viscosity tests are presented in Table 1, below.

Figure 2:
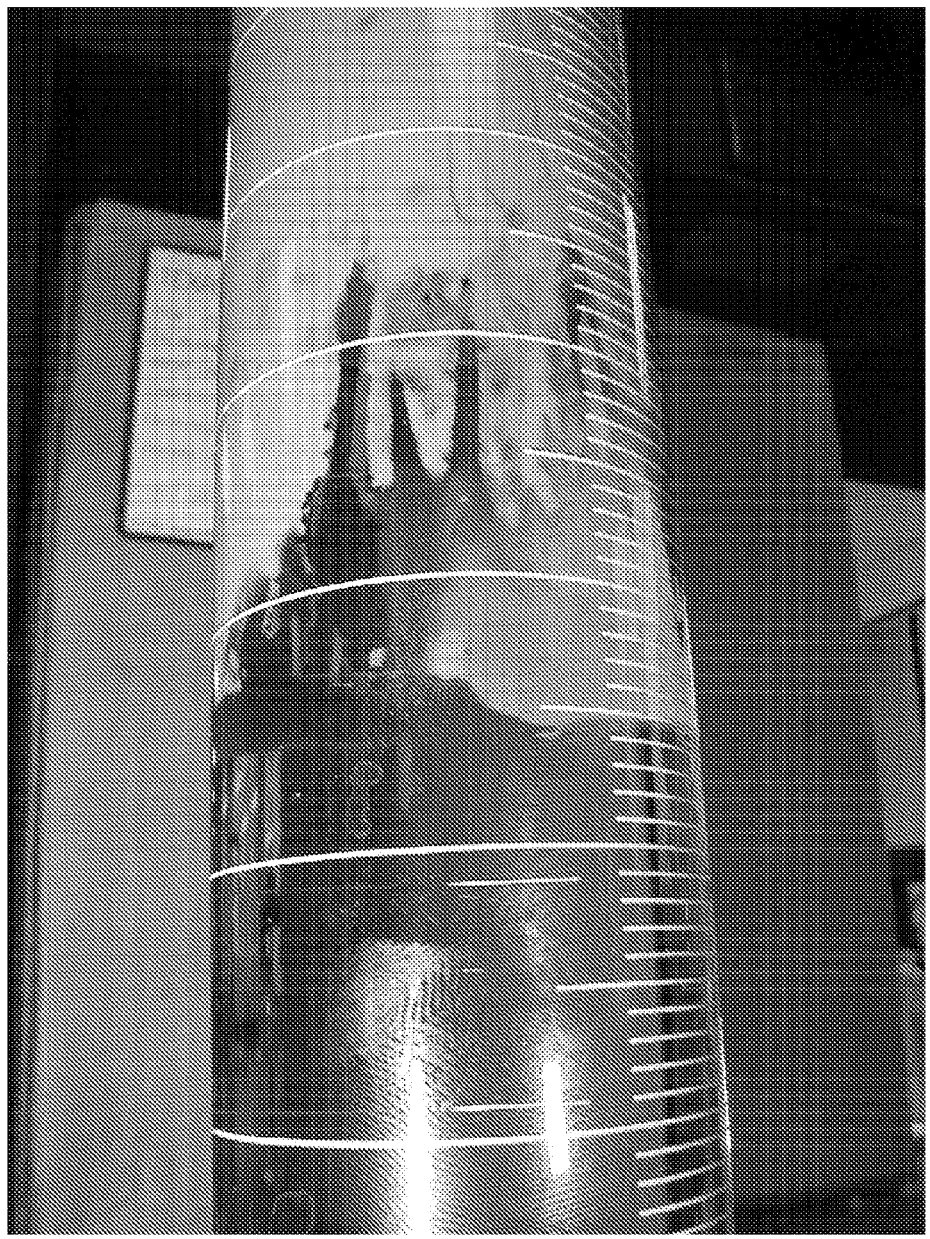
FIG. 2 demonstrates a reduced viscosity FPTP (12.5 lb/gal with 6 lb/bbl of organophilic clay) mixing with 15.0 lb/gal $CaBr_2/ZnBr_2$ brine during pill placement in a vertical orientation.
Figure 3A:
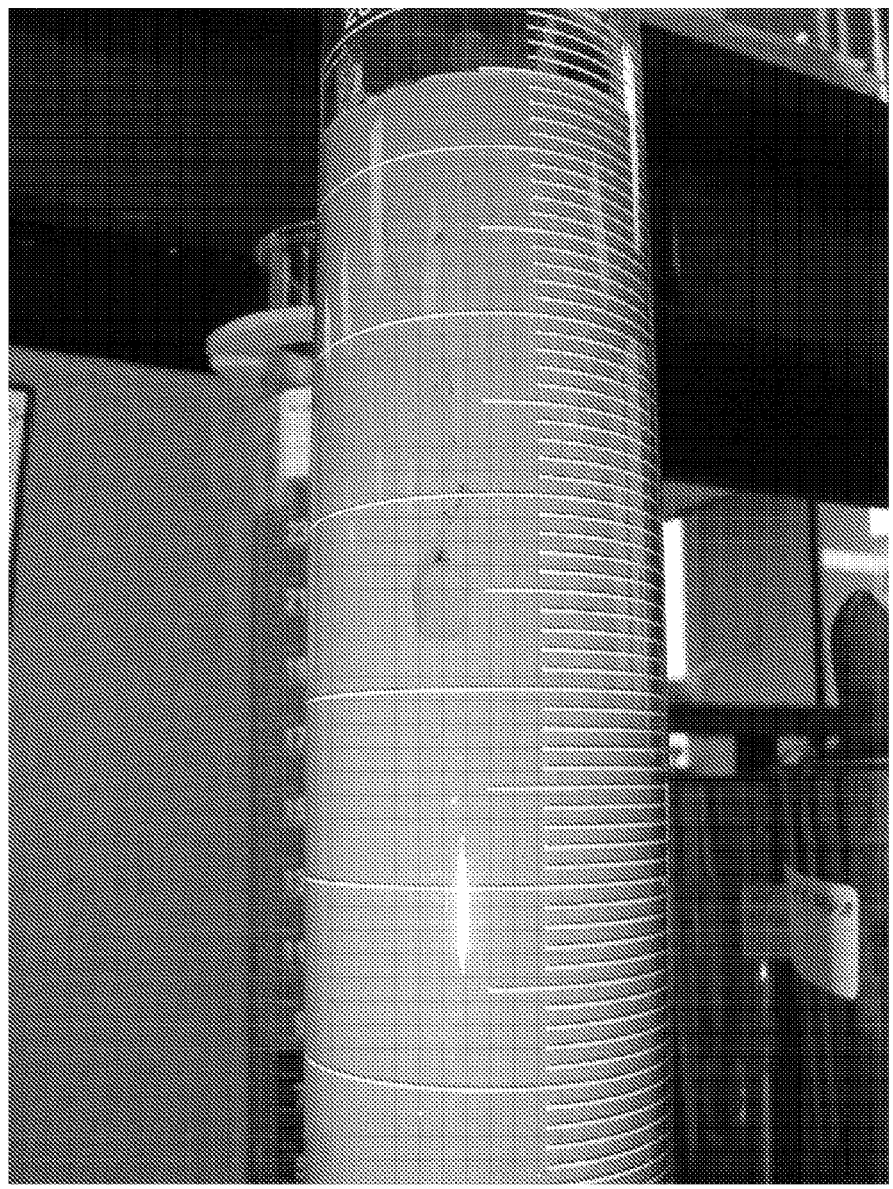
FIG. 3A shows brine (15.0 lb/gal $CaBr_2/ZnBr_2$) descending through a 12.5 lb/gal reduced viscosity FPTP (8 lb/bbl of organophilic clay) in a vertical orientation.
Figure 3B:
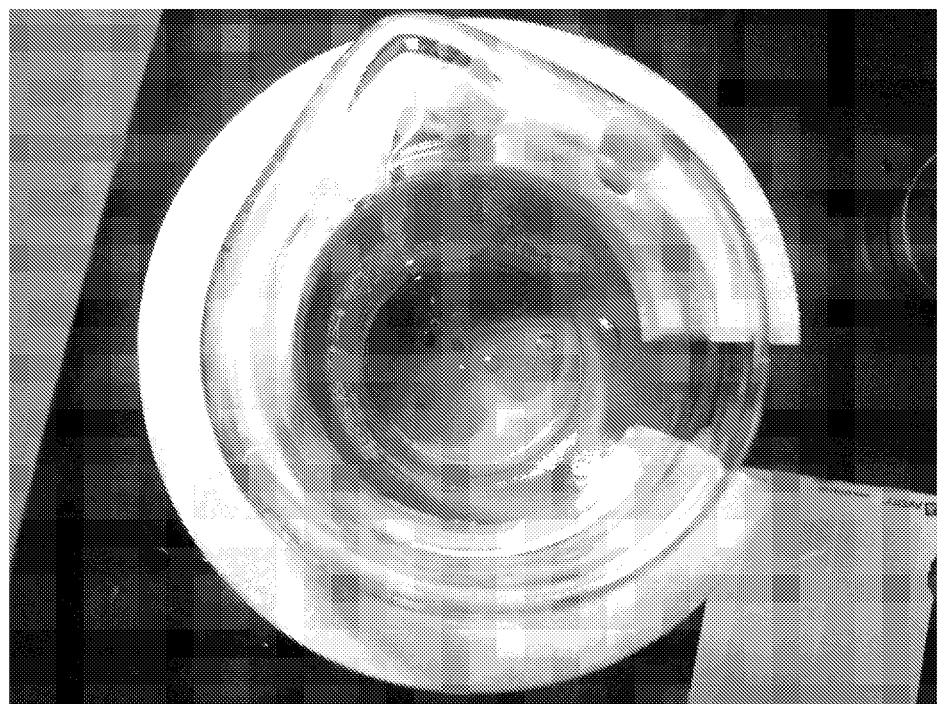
FIG. 3B illustrates the top view of a 12.5 lb/gal reduced viscosity FPTP (8 lb/bbl of organophilic clay) after all the 15.0 lb/gal $CaBr_2/ZnBr_2$ has channeled through the pill.

Similar to the test in Example 1 above, in order to assess the ability and integrity of the high-viscosity pills with varying amounts of thixotropic viscosifying agents to isolate the high-density oil-base drilling fluid in the upper region of a well bore from a lighter oil-base fluid in the deeper section, a series of observational laboratory tests were conducted using vertically-oriented 250 mL graduated cylinders to simulate a well bore. In a typical test, for demonstration purposes, brines were substituted for oil-base drilling fluids above and below the fluid pressure transmission pills (FPTP) to provide a more visible interface between stages. First, 85 mL of a 15.0 lb/gal CaBr$_2$/ZnBr$_2$ brine was placed in the bottom of a 250 mL glass graduated cylinder, and on top of that, 85 mL of a 12.5 lb/gal high viscosity pill prepared as described above was added, and then an additional 85 mL of a 15.0 lb/gal CaBr$_2$/ZnBr$_2$ brine was added on top of the pill by slowly releasing it from a syringe down the side of the cylinder. The total volume placed into the cylinder was about 255 mL, with (preferably) the brine remaining above the FPTP, with little to no downward channeling. A vertical orientation was established, visual observations were made, and the observations were documented with pictures taken at time zero (0), and after 2 hours. These results are illustrated in FIGS. 2, 3A, and 3B, herein. As can be seen from these Figures, the 6 lb/bbl (12.5 lb/gal) pill does not establish a barrier and mixes with the 15.0 lb/gal brine as it is pipetted into position, while the 8 lb/bbl pill allows the 15.0 lb/gal brine to channel through to the brine below, thereby displacing the pill upward.

TABLE 1

Viscosity data for the pill compositions of Examples 1 and 2.

| Composition/Parameters | Viscosity of 12.5 lb/gal pills with varied levels of thixotropic viscosifier (cP) | | |
|---|---|---|---|
| Mineral Oil, bbl | 0.772 | 0.772 | 0.675 |
| Organophilic Clay, lb/bbl | 6.0 | 8.0 | 12.5 |
| Polar Activator, gal/bbl | 0.12 | 0.12 | 0.18 |

TABLE 1-continued

Viscosity data for the pill compositions of Examples 1 and 2.

| Composition/Parameters | | Viscosity of 12.5 lb/gal pills with varied levels of thixotropic viscosifier (cP) | | |
|---|---|---|---|---|
| Emulsifier/Wetting Agent, gal/bbl | | 0.3 | 0.3 | 0.144 |
| Copolymer Slurry, gal/bbl | | — | — | 4.32 |
| Barite, lb/bbl | | 298.0 | 298.0 | 288.0 |
| Temperature, ° F. | | 75 | 75 | 75 |
| LSRV, cP | 0.0660 sec$^{-1}$ | 7,040 | — | 119,000 |
| | 0.0636 sec$^{-1}$ | — | 52,300 | — |

Other and further embodiments utilizing one or more aspects of the invention described above can be devised without departing from the spirit of Applicant's invention. For example, the fluid pressure transmission pill (FPTP) can be used in various other hydrocarbon recovery operations, including well-killing operations such as the simultaneous killing and cementing of a live well (e.g., kill the well so that the cement could be placed and allowed to set while at the same time not breaking down and losing circulation into the weak upper zones). As used herein, the phrase "well-killing operation" refers to the operation of placing a column of heavy fluid into a well bore in order to prevent the flow of reservoir fluids without the need for pressure control equipment at the surface, the procedure operating on the principle that the weight of the "kill fluid" or "kill mud" will be enough to suppress the pressure of the formation fluids. Further, the various embodiments of the ultra-high viscosity pill composition and methods of preparation and use in subterranean operations can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of controlling pressure in a wellbore extending into a subterranean formation, the method comprising:
   providing a fluid pressure transmission pill (FPTP) consisting of an oleagineous liquid, a polar activator, a weighting agent and an organophilic clay;
   introducing the FPTP into the wellbore while a first fluid is present in the well bore; and
   introducing a second fluid into the wellbore while the first fluid and the FPTP are in the wellbore; wherein
   the FPTP isolates the first fluid from the second fluid.

2. The method of claim 1, wherein the FPTP has a mud weight ranging from about 7 lb/gal to about 20 lb/gal.

3. The method of claim 1, wherein the polar activator is selected from the group consisting of sodium silicate, sodium fluoride, sodium silicofluoride, magnesium silicofluoride, zinc silicofluoride, calcium carbonate, sodium carbonate, potassium carbonate, alkyl carbonates, calcium hydroxide, sodium hydroxide, potassium hydroxide, sodium sulfate, polar, aprotic compounds, and mixtures thereof.

4. The method of claim 3, wherein the polar activator is propylene carbonate.

5. The method of claim 1, wherein the weighting agent is a material selected from the group consisting of anglesite, barite, calcite, celestite, crocoite, hematite, ilmenite, or combinations thereof.

6. The method of claim 1, wherein the weighting agent is barite.

7. The method of claim 1, wherein the first and second fluids are drilling fluids.

8. The method of claim 1, wherein the second fluid has a greater density than the first fluid.

9. The method of claim 1, wherein the FPTP has a viscosity greater than that of the first and second fluids.

10. The method of claim 1, wherein the FPTP has a viscosity greater than about 100,000 cP measured at 0.0660 sec$^{-1}$.

* * * * *